United States Patent
Rossmann et al.

(10) Patent No.: US 6,471,485 B1
(45) Date of Patent: Oct. 29, 2002

(54) ROTOR WITH INTEGRATED BLADING

(75) Inventors: Axel Rossmann, Karlsfeld; Siegfried Sikorski, Munich; Wolfgang Krueger, Reichertshausen, all of (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 09/554,676

(22) PCT Filed: Nov. 17, 1998

(86) PCT No.: PCT/DE98/03375

§ 371 (c)(1),
(2), (4) Date: Jul. 17, 2000

(87) PCT Pub. No.: WO99/27234

PCT Pub. Date: Jun. 3, 1999

(30) Foreign Application Priority Data

Nov. 19, 1997 (DE) .......................... 197 51 129

(51) Int. Cl.⁷ ................................. F01D 5/14
(52) U.S. Cl. .................. 416/230; 416/229 A; 416/234; 416/223 A
(58) Field of Search ................ 416/2, 229 R, 416/230, 229 A, 234, 223 A, 223 R, 203

(56) References Cited

U.S. PATENT DOCUMENTS

| | | | |
|---|---|---|---|
| 1,364,197 A | * | 1/1921 | Heath ................ 416/229 R |
| 2,630,868 A | * | 3/1953 | Ellenberger ............ 416/230 |
| 3,088,192 A | | 5/1963 | Turner |
| 3,294,366 A | | 12/1966 | Coplin |
| 3,602,608 A | | 8/1971 | Morley |
| 3,628,890 A | | 12/1971 | Schueler et al. |
| 3,762,835 A | | 10/1973 | Carlson et al. |
| 3,883,267 A | | 5/1975 | Baudier et al. |
| 4,006,999 A | | 2/1977 | Brantley et al. |
| 4,944,655 A | * | 7/1990 | Merz ...................... 416/61 |
| 5,490,764 A | | 2/1996 | Schilling |
| 5,655,883 A | | 8/1997 | Schilling |
| 5,725,355 A | * | 3/1998 | Crall et al. .......... 416/229 A |
| 5,785,498 A | | 7/1998 | Quinn et al. |
| 6,132,857 A | * | 10/2000 | Champenois et al. .... 428/300.7 |

FOREIGN PATENT DOCUMENTS

| | | |
|---|---|---|
| DE | 2042665 | 3/1971 |
| DE | 2631856 | 2/1977 |
| DE | 3821005 | 12/1989 |
| DE | 19535713 | 4/1996 |
| EP | 0764763 | 3/1997 |

* cited by examiner

Primary Examiner—Edward K. Look
Assistant Examiner—Ninh Nguyen
(74) Attorney, Agent, or Firm—W. F. Fasse; W. G. Fasse

(57) ABSTRACT

A rotor for a propulsion plant has hybrid rotor blades arranged circumferentially around and extending essentially radially from a rotor. To reduce vibrations, the rotor blade has a metallic blade root and each blade has a metallic blade section that forms at least a portion of the blade leading edge and the area of the blade surface adjacent to the blade leading edge, and a blade section made of fiber-reinforced synthetic material or composite material. The blade sections (3, 4) of each blade (1) are so correlated to each other that damage or loss of the composite material blade section (4) still enables the propulsion plant to deliver a required emergency power.

10 Claims, 2 Drawing Sheets

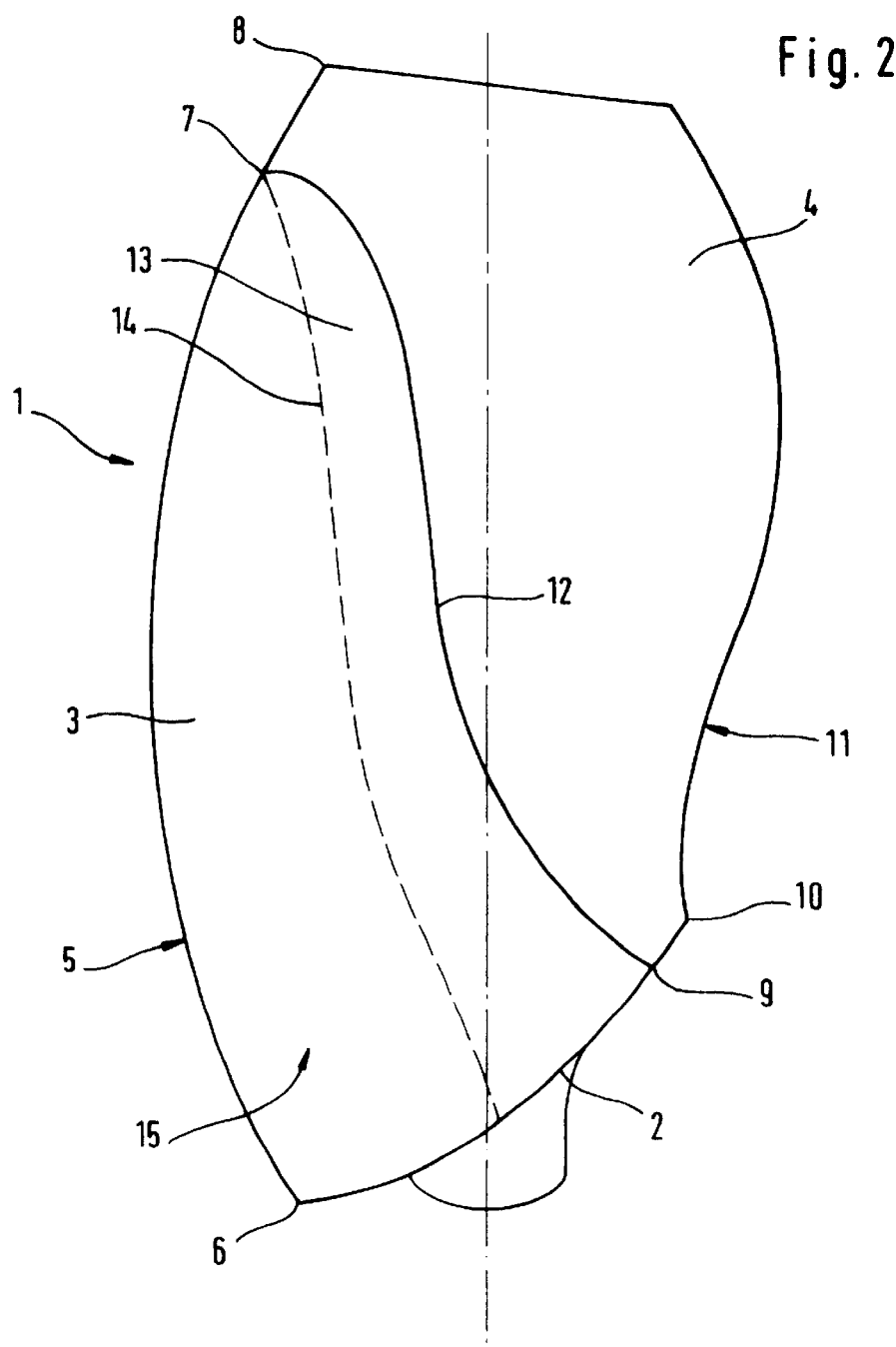
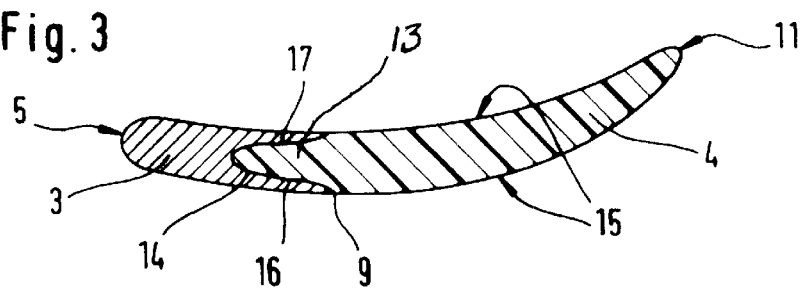

ROTOR WITH INTEGRATED BLADING

FIELD OF THE INVENTION

The invention relates to a rotor with integrated blading, particularly for a propulsion plant. Rotor blades are arranged circumferentially around and extend essentially radially from the rotor.

BACKGROUND INFORMATION

Conventional fan rotor blades of fiber-reinforced synthetic material have a relatively large diameter, for example 3.2 m. Such fan rotor blades are produced as a solid construction with an integrated dovetail root or as a hollow construction with an internal piece, a so-called spar. The use of fiber-reinforced synthetic material, so-called composite material for blade sections, instead of metal, has the advantage of a substantial weight reduction. The described construction, however, is not suitable for smaller fan rotor blades operating at higher circumferential speeds because they cannot withstand the prescribed load caused by a bird impact. In order to nevertheless make use of the weight advantage, a blade section of fiber-reinforced synthetic material is attached at the blade root in a metallic retaining yoke. This hybrid construction has the disadvantage that the blade sections of synthetic material lack ductility. As a result, too large parts of the blade sections can break off upon a bird impact so that the propulsion plant can no longer provide the necessary emergency power. Furthermore, the retaining yoke is open toward the leading edge and the trailing edge of the blade and is torsionally soft. Moreover, the blade section of composite material is not protected against erosion.

German Patent Publication DE-OS 20 42 665 discloses a compressor blade that comprises a metal component that forms the entering or leading edge profile portion of the blade and a fiber-containing composite component that forms the remaining portion of the airfoil profile. The composite component of the airfoil is received in a groove in the metal component, and the metal component has a shaft for detachably connecting the compressor blade to a rotor disk.

German Patent Publication DE 195 35 713 A1 discloses a composite blade on which sections of the trailing edge are covered with a metallic cladding to reduce material losses on the trailing edge.

German Patent Publication DE 26 31 856 C2 discloses a compressor blade of a composite material, in which the fiber material is partially protected, at least on the leading side, with a metallic edge protector. The compressor blade has a dovetail for detachable attachment to a rotor.

U.S. Pat. No. 3,883,267 discloses a blade for a gas turbine with a metallic core having in a curved shape, around which a blade pan section of fiber-reinforced material is constructed.

The rotor blades are generally detachably secured to the circumferential surface of a rotor carrier, for example with a dovetail connection. The vibrations that occur during operation are thereby attenuated by the friction between the dovetail at the blade root and the corresponding groove in the rotor carrier. Such attenuation is lacking on integrally bladed rotors. As a result, the vibrations that occur during operation and the fatigue notching effect resulting from defective points occurring on the blade section, such as cracks, present a problem.

SUMMARY OF THE INVENTION

An object of the invention is to provide a rotor with integrated blading of the type described above, that will reduce the vibrations occurring during operation. In addition, the blading should also be as lightweight as possible.

The foregoing objects have been achieved according to the invention in that the present rotor blades have a metallic blade root, a metallic blade first blade section that forms at least a portion of the blade leading edge and the surface area adjacent to the leading blade edge, and a second blade section made of fiber-reinforced synthetic or composite material. More specifically, a compressor rotor according to the invention comprises said compressor rotor comprising a rotor blade carrier, rotor blades secured to said rotor carrier, each rotor blade comprising a metal blade root securing said rotor blade to said rotor carrier, a first blade section made of metal and a second blade section made of fiber composite material, said first metal blade section forming at least a portion of a blade leading edge, said second fiber composite material blade section forming a blade trailing edge, means connecting said first metal blade section and said second fiber composite material blade section to each other along a trailing rim of said first metal blade section, and wherein said first metal blade section has a radial length along said leading edge shorter than a length of said leading edge and a surface area extending between said radial length and said trailing rim so that said surface area has a size enabling said propulsion plant to deliver emergency power even if said second fiber composite material blade section is broken off.

The advantage results from the fact that such rotor blades, on the one hand, provide significant weight advantages over metallic blades because of the use of composite material and, on the other hand, such blades have an increased ductility and protection against erosion because of the metallic first blade section that extends along at least a portion of the leading edge of the blade and the surface area of the blade that borders on the leading edge. In addition, the present rotor blades provide a good vibration attenuation. Because of the metallic blade pan sections, the rotor blades are robust, particularly in the hub area. In the case of breakage, it is a simple matter to repair such composite material blade sections by replacing them. Based on the good damping characteristics with rotors bladed according to the invention, particularly such as compressor rotors or fan rotors, a greater fatigue notching effect resulting from defective areas that appear during operation, for example cracks, can be allowed for the present blades. Consequently, a rotor or its rotor blades according to the invention will require less frequent repair compared to conventional rotors subjected to normal wear.

Preferably, the metallic blade section forms the blade leading edge beginning radially inside at the blade root and ending a distance from the radial outer end of the blade leading edge or the blade surface. In this way, the rotor blades are protected at the flow stagnation point that occurs at the blade leading edge and at the blade surface areas next to both sides of the leading edge around which flow occurs.

Furthermore, it is preferable that the metallic blade pan section has a slot or groove in which the blade of fiber-reinforced synthetic material is held.

It is advantageous that the slot or groove extends completely across an end section, for example, in a curved progression, from a first end that lies on the leading edge of the blade to a second end of the metallic blade pan section that is axially farther back from the first end and is spaced from the blade leading edge.

It can be useful to attach the blade section made of composite material to the metallic blade section by an adhesive bond and/or by rivets.

Furthermore, it is preferable that the blade root and/or the metal blade sections are made of a titanium alloy.

Most preferably, a plurality of fan rotor blades are arranged circumferentially and equidistant from another on a compressor disk and extend essentially radially so as to form an integrally bladed compressor disk, a so-called blisk. In this case, the fan rotor blades are attached to the disk by friction welding or the like to form a single-piece component. This feature reduces the weight of the blisk, which has a positive effect on the damping, as well as the magnitude of the rotational speeds.

Preferably, a circumferentially bladed rotor carrier is a compressor disk, whereby the rotor carrier can alternatively also be a compressor ring.

BRIEF DESCRIPTION OF THE DRAWINGS

The invention will now be explained based on an example embodiment with reference to the accompanying drawings, wherein:

FIG. 2 is a schematic, perspective view of an example embodiment of a fan rotor blade of the rotor according to the invention; and FIG. 3 a sectional view of the fan rotor blade of FIG. 2.

Figure 1:
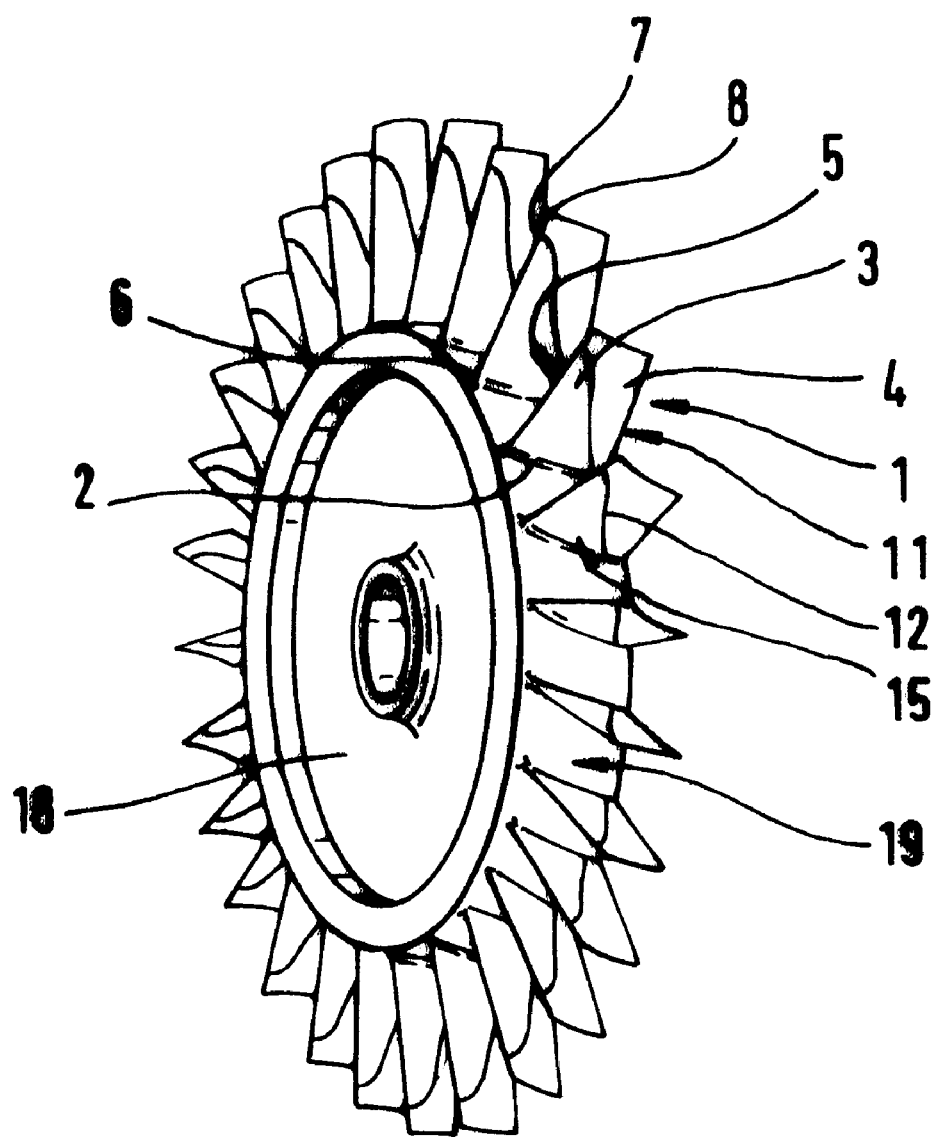
FIG. 1 shows a schematic, perspective view of an example embodiment of the rotor according to the invention.

DETAILED DESCRIPTION OF PREFERRED EXAMPLE EMBODIMENTS AND OF THE BEST MODE OF THE INVENTION

FIG. 1 shows an example embodiment of the rotor according to the invention, for example a compressor rotor, with integrated blading for a flight propulsion plant. A rotor carrier 18 is a compressor disk or ring. A plurality of rotor blades 1 is attached to a circumferential surface 19 of the rotor carrier 18. Rotor blades 1 extend essentially radially from the rotor carrier 18. The rotor blades 1 comprise respectively a metallic first blade section 3 and a second blade section 4 of fiber-reinforced synthetic material. The metallic first blade section 3 and the compressor disk 18 can, for example, be milled from a solid piece, or can be initially manufactured separately and then integrally connected to one another by a suitable method. In this context induction welding with high frequency current is a suitable choice in which a forged microstructure is formed in a joint plane between the compressor disk 18 and the rotor blade 1.

According to the embodiment shown in FIG. 1, the metallic first blade section 3 forms at least a portion of a blade leading edge 5 and a neighboring area of a blade surface 15. A trailing rim 12 of the metallic first blade section 3 according to this embodiment has a curved edge facing a trailing edge 11 of the blade 1. The trailing rim 12 is so constructed that should the blade 4 of fiber-reinforced synthetic material break and possibly be eliminated, the propulsion plant will still provide a prescribed emergency power due to the size of the remaining metallic blade section 3 with its curved trailing rim 12.

FIG. 2 shows a rotor blade 1 of a hybrid construction that is a fan rotor blade of a fan rotor according to the present embodiment and, by way of example, is used in a propulsion plant with a diameter of approximately 1.5 m. The fan rotor blade 1 comprises essentially a metallic blade root 2, a metallic first blade section 3, and a second blade section 4 of fiber-reinforced material. The blade root 2 and the first blade section 3 are formed as a single piece and are made for example of a titanium alloy. The blade root 2 is shown as an example only and is formed in a suitable shape with reference to the integral attachment of the fan blade 1 to a rotor carrier 18. Various fibers such as, for example carbon fibers, glass fibers, or aramid fibers, can be used to reinforce the second blade section 4 of fiber composite material.

The metallic blade section 3 forms a part of a blade leading edge 5 in which the blade section 3 extends from a radial inner end point 6 of the blade leading edge 5, that is, beginning radially at the blade root 2, to an end point 7 of the metallic blade section 3. End point 7 is positioned at a distance from a radial outer end point 8 of the leading edge 5 of the blade or of the blade surface 15. The present metallic blade section 3 extends radially between points 6 and 7 over approximately 9/10 of the length of the blade leading edge 5 between end points 6 and 8, whereby tests have shown that a preferred value is 2/3 of the length of the blade leading edge 5. In this way, the blade leading edge 5 that faces the air flow, at which the stagnation point of the airflow flowing around the fan rotor blade 1 lies, is sufficiently protected against erosion and bird impact. Furthermore, the radial height of the metallic blade section 3 is so constructed that even if the synthetic material blade section 4 is completely broken off, the prescribed operating behavior of the propulsion plant is ensured and emergency power is provided.

As can be seen in FIG. 2, the metallic blade section 3 beginning at the radial inner end point 6 of the blade leading edge 5 does not extend over the entire width of the blade surface 15 to a radial inner end point 10 of a blade trailing edge 11, but rather, the metallic blade section 3 ends a distance from the radial inner end point 10 at an end point 9 that is spaced from the blade leading edge 5 and from the trailing edge 11.

Since the metallic blade section 3 is preferably made of a titanium alloy, the fan rotor blade 1 possesses a sufficient ductility and is robust, particularly when subject to a bird impact in the hub area. Moreover, the blade surface 15 is formed primarily by the second blade section 4 of fiber-reinforced material with a density of approximately 1.6 g/cm³, while the titanium alloy has a density of approximately 4.5 g/cm³. As a result, the present fan rotor blade 1 has a relatively low weight and is also suitable for propulsion plants with high circumferential speeds.

As mentioned above, the trailing rim 12 of the metal blade section 3 extending between the end point 7 and the end point 9 of the metallic blade section 3 has, in the present embodiment, a curved configuration as best seen in FIG. 2. Since the fan rotor blade 1 of the present embodiment is dimensioned according to conventional criteria for fan blades, the curvature of this trailing rim 12 can also have another curvature adapted to the criteria. It should, however, always be ensured that the metallic blade section 3 guarantees the delivery of a prescribed emergency power of the propulsion plant, even with a complete breakage and resulting elimination of the blade section 4 of fiber-reinforced material.

FIG. 2 further shows a joint area 13 shown with a dashed line. This joint area is more clearly recognizable in the sectional view according to FIG. 3. The joint area or connection is formed by a slot or groove 14 in the metallic blade section 3 into which the blade section 4 is inserted with its tongue 13 and attached by adhesive bonding or by another suitable method of connection such as riveting or clamping. The two flanks 16, 17 of the slot or groove 14 can have a differing length, depending on the blade configuration. The slot or groove 14 extends from the point 7 that lies on the blade leading edge 5 to the point 9 of the metallic blade section 3 a certain distance away from the blade leading edge 5, across the entire length of the metallic blade section 3 that extends essentially radially. The point 9 of the metallic blade section 3 can alternatively be arranged farther outwardly or even on the blade trailing edge 11, depending on the particular application. The characteristics described on the basis of the example embodiment of the fan rotor blade 1 apply in the same manner for all other rotor blades.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A compressor rotor for a propulsion plant, said compressor rotor comprising a rotor blade carrier (18), rotor blades (1) secured to said rotor carrier, each rotor blade (1) comprising a metal blade root (2) securing said rotor blade to said rotor carrier (18), a first blade section (3) made of metal and a second blade section (4) made of fiber composite material, said first metal blade section (3) forming at least a portion of a blade leading edge (5), said second fiber composite material blade section (4) forming a blade trailing edge (11), means connecting said first metal blade section (3) and said second fiber composite material blade section (4) to each other along a trailing rim (12) of said first metal blade section (3), and wherein said first metal blade section (3) has a radial length along said leading edge (5) shorter than a length of said leading edge (5) and a surface area (15) extending between said radial length and said trailing rim (12) so that said surface area (15) has a size enabling said propulsion plant to deliver emergency power even if said second fiber composite material blade section (4) is broken off.

2. The compressor rotor of claim 1, wherein said means connecting said first metal blade section (3) and said second fiber composite material blade section (4) comprise a tongue (13) and a groove (14) securing said first and second blade sections to each other.

3. The compressor rotor of claim 2, wherein said groove (14) extends in said trailing rim (12) of said first metal blade section (3) from a point (7) on said trailing edge (5) to a further point (9) on said blade root (2) between said leading edge (5) and said blade trailing edge (11).

4. The compressor rotor of claim 1, wherein said means connecting said first metal blade section (3) to said second fiber composite material blade section (4) comprise at least one of an adhesive bonding, riveting and clamping.

5. The compressor rotor of claim 1, wherein said metal blade root (2) and said first metal blade section (3) are made of titanium.

6. The compressor rotor of claim 1, wherein said rotor carrier (18) is one of a compressor disk and a compressor ring.

7. The compressor rotor of claim 1, wherein all rotor blades (1) are integrally attached said rotor carrier (18) by a junction having a forged grain structure formed by induction welding with a high frequency electric current.

8. The compressor rotor of claim 1, wherein said trailing rim (12) of said first metal blade section (3) having said surface area (15), is curved from a radially outer end point (7) on said leading edge (5) to a radially inner end point (9) on said surface area (15) between said leading edge (5) and said trailing edge (4).

9. A blade for a compressor rotor, said blade (1) comprising a metal blade root (2) for attaching said blade to a rotor blade carrier, a first metal blade section (3), said first metal blade section (3) forming at least a portion of a blade leading edge (5), a second fiber composite material blade section (4) forming a trailing edge (11) of said blade (1), means connecting said first and second blade sections to each other along a trailing rim (12) of said first blade section (3), said first blade section having a radial length along said leading edge (5) shorter than a length of said leading edge (5), said first section (3) further comprising a surface area (15) extending between said radial length and said trailing rim (12) so that said surface area has a size enabling a compressor to deliver emergency power even if said second blade section (14) is broken off.

10. The compressor rotor of claim 9, wherein said trailing rim (12) of said first metal blade section (3) having said surface area (15), is curved from a radially outer end point (7) on said leading edge (5) and a radially inner end point (9) on said surface area (15) between said leading edge (5) and said trailing edge (4).

* * * * *